(12) United States Patent
Feiteira et al.

(10) Patent No.: US 12,536,596 B1
(45) Date of Patent: *Jan. 27, 2026

(54) SELF-SERVICE CLAIM AUTOMATION USING ARTIFICIAL INTELLIGENCE

(71) Applicant: Liberty Mutual Insurance Company, Boston, MA (US)

(72) Inventors: Ernesto Feiteira, Boston, MA (US); Ross Guida, Boston, MA (US); Julia Muhlen, Boston, MA (US); Donald Lynch Sierra, North Easton, MA (US); David Paul Clark, Cary, NC (US)

(73) Assignee: Liberty Mutual Insurance Company, Boston, MA (US)

( * ) Notice: Subject to any disclaimer, the term of this patent is extended or adjusted under 35 U.S.C. 154(b) by 246 days.

This patent is subject to a terminal disclaimer.

(21) Appl. No.: 18/141,895

(22) Filed: May 1, 2023

Related U.S. Application Data

(63) Continuation of application No. 17/522,444, filed on Nov. 9, 2021, now Pat. No. 11,676,215, which is a
(Continued)

(51) Int. Cl.
*G06Q 40/08* (2012.01)
*G06N 5/048* (2023.01)

(52) U.S. Cl.
CPC ............. *G06Q 40/08* (2013.01); *G06N 5/048* (2013.01)

(58) Field of Classification Search
CPC .................................................. G06Q 30/0185
See application file for complete search history.

(56) References Cited

U.S. PATENT DOCUMENTS 8,401,878 B2   3/2013   Stender et al.
9,767,309 B1   9/2017   Patel et al.
(Continued)

FOREIGN PATENT DOCUMENTS

IN    1895/CHE/2010    3/2010
WO    2016/055085 A1   4/2016

OTHER PUBLICATIONS

U.S. Appl. No. 17/522,444, filed Nov. 9, 2021, U.S. Pat. No. 11,676,215, Issued.
(Continued)

*Primary Examiner* — Ojo O Oyebisi
(74) *Attorney, Agent, or Firm* — ALSTON & BIRD LLP

(57) ABSTRACT

Embodiments are disclosed for automatically processing a claim provided by a user. Responsive to receiving a notice of loss associated with a claim of a user, a set of customer identity validation data are collected. The set of customer identity validation data may be determined to meet a pre-defined identity validation criteria. Responsive to determining that the set of customer identity validation data meets the pre-defined identity validation criteria, current claim evaluation data for the claim may be accessed. A set of predictive impact assessment scores associated with the current claim evaluation data may be determined using a predictive model. The set of current claim evaluation data may be determined to meet pre-defined claim data criteria by comparing the predictive impact assessment scores with a set of impact assessment thresholds. Responsive to determining that the set of current claim evaluation data meets the pre-defined claim data criteria, a reactive action to the claim may be determined.

20 Claims, 9 Drawing Sheets

Related U.S. Application Data continuation of application No. 16/003,280, filed on Jun. 8, 2018, now Pat. No. 11,250,515.

(60) Provisional application No. 62/517,449, filed on Jun. 9, 2017.

(56) References Cited

U.S. PATENT DOCUMENTS

| | | | |
|---|---|---|---|
| 10,102,585 | B1 | 10/2018 | Bryant et al. |
| 10,529,028 | B1 | 1/2020 | Davis et al. |
| 10,628,890 | B2 * | 4/2020 | Dong ................ G06Q 30/0185 |
| 10,733,674 | B2 | 8/2020 | Unsworth et al. |
| 11,250,515 | B1 | 2/2022 | Feiteira et al. |
| 11,361,380 | B2 | 6/2022 | Kelsh et al. |
| 11,676,215 | B1 | 6/2023 | Feiteira et al. |
| 2002/0055861 | A1 | 5/2002 | King et al. |
| 2010/0049552 | A1 | 2/2010 | Fini et al. |
| 2013/0204645 | A1 | 8/2013 | Lehman et al. |
| 2015/0213556 | A1 | 7/2015 | Haller, Jr. |
| 2015/0324924 | A1 | 11/2015 | Wilson et al. |
| 2017/0089710 | A1 | 3/2017 | Slusar |
| 2017/0091868 | A1 | 3/2017 | Trainor et al. |
| 2017/0091869 | A1 | 3/2017 | Trainor et al. |
| 2017/0109828 | A1 | 4/2017 | Pierce et al. |
| 2017/0270613 | A1 | 9/2017 | Scott et al. |
| 2017/0352104 | A1 | 12/2017 | Hanson et al. |
| 2018/0300576 | A1 | 10/2018 | Dalyac et al. |
| 2020/0034958 | A1 | 1/2020 | Campbell et al. |

OTHER PUBLICATIONS

U.S. Appl. No. 16/003,280, filed Jun. 8, 2018, U.S. Pat. No. 11,250,515, Issued.

Roy, "Detecting Insurance Claims Fraud using Machine Learning Techniques", IEEE. 2017 International Conference on circuits Power and Computing Technologies, Apr. 1, 2017. (Year: 2017).

Van Eeden, J., Insurance's Evolution Through Tech, Bizcommunity (Jan. 24, 2017) 2 pages.

Yan, "The Identification Algorithm and Model Construction of Automobile Insurance Fraud Based on Data Mining", 2015 Fifth International Conference on Instrumentation and Measurement, Computer, Communication and Control, 2015. (Year: 2015).

* cited by examiner

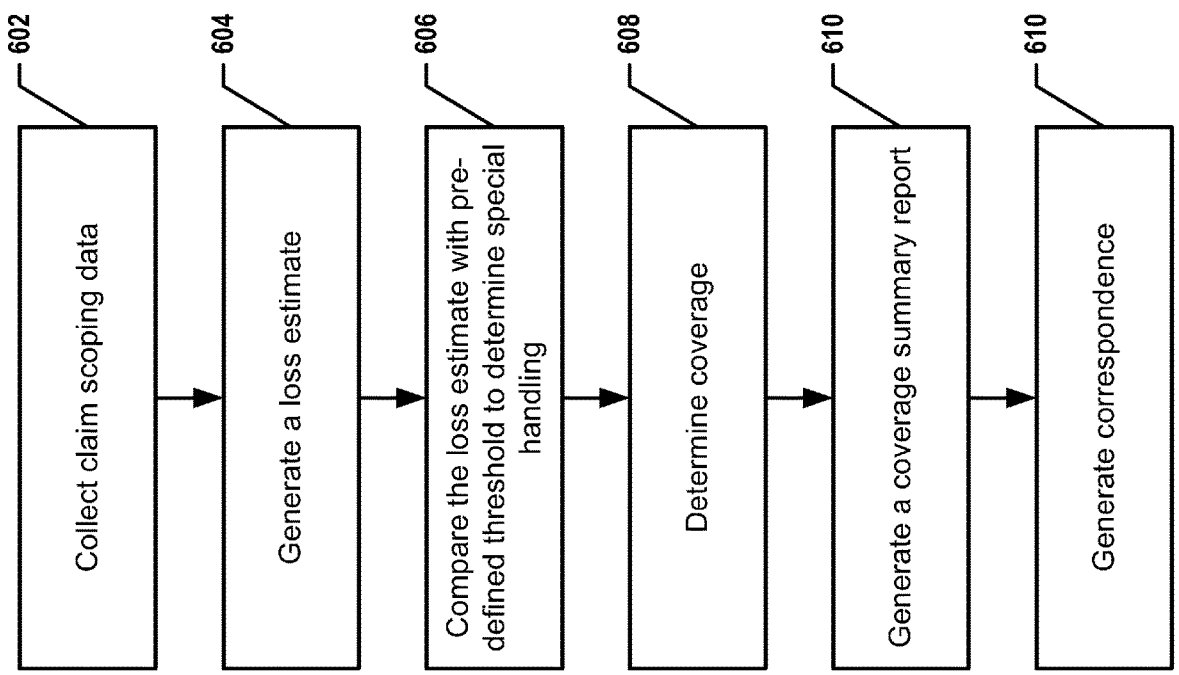

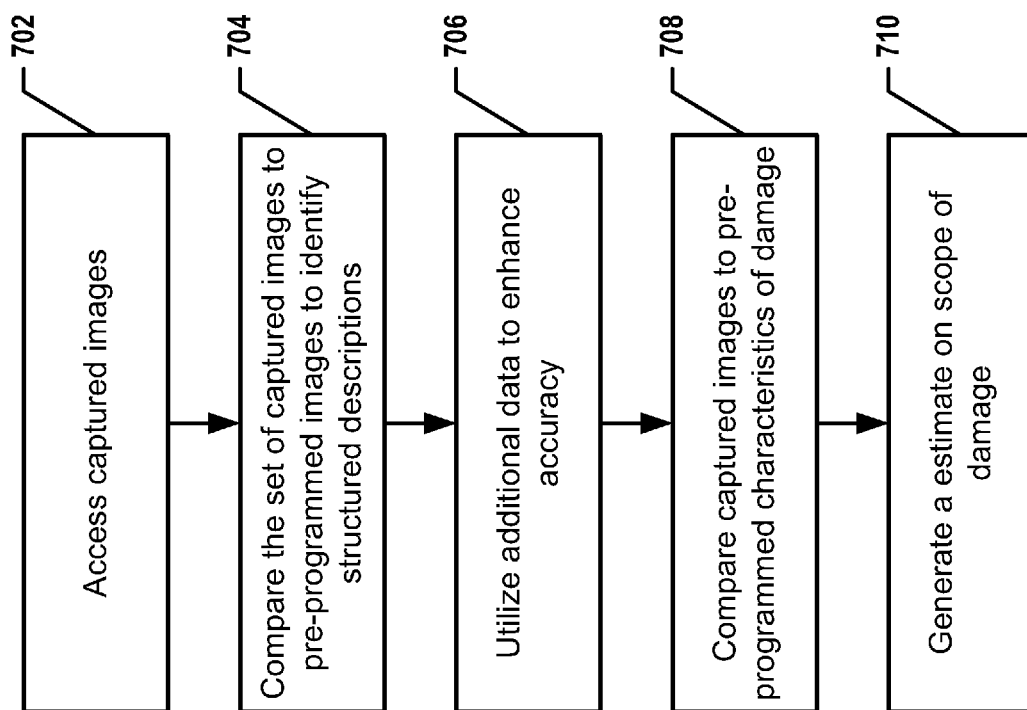

FIG. 8

| Policy Page Number | Section | Policy Text | Incident: Employee Dishonesty | Incident: Lightning | Incident: Theft |
|---|---|---|---|---|---|
| 21 | f. | Dishonesty | Exclusion | No Impact | No Impact |
| 21 | | Dishonest or criminal acts (including theft) by you, anyone else with an interest in the property, or any of your or their partners, "members", officers, "managers", employees (including temporary or leased employees), directors, trustees or authorized representatives, whether acting alone or in collusion with each other or with any other party; or theft by any person to whom you entrust the property for any purpose, whether acting alone or in collusion with any other party. | Exclusion | No Impact | No Impact |
| 21 | f. | This exclusion: | Exclusion | No Impact | No Impact |
| 21 | f. (1) | Applies whether or not an act occurs during your normal hours of operation; | Exclusion | No Impact | No Impact |

FIG. 9

| Loss Date: 05-01-18 | Policy Period 03-01-2018 to 03-01-2019 | Within policy period so a compensable loss |
|---|---|---|
| Incident: Fire | Executes incident analysis against policy mapping | No exclusions apply |
| Property: Building | Executes subcategory analysis against mapped items | No unique subcategory restrictions |
| Damage Amount: $50,000 | Limits $1,500,000 | Computes damage cost to limits to determine |

SELF-SERVICE CLAIM AUTOMATION USING ARTIFICIAL INTELLIGENCE

CROSS-REFERENCE TO RELATED APPLICATIONS

This application is a continuation of U.S. application Ser. No. 17/522,444, titled "SELF-SERVICE CLAIM AUTOMATION USING ARTIFICIAL INTELLIGENCE," filed Nov. 9, 2021, which is a continuation of U.S. application Ser. No. 16/003,280, titled "SELF-SERVICE CLAIM AUTOMATION USING ARTIFICIAL INTELLIGENCE," filed Jun. 8, 2018, which claims priority to U.S. Provisional Application Ser. No. 62/517,449, filed Jun. 9, 2017, the contents of each of which are hereby incorporated by reference herein in their entirety.

BACKGROUND

Claims and loss handling is a process of insurance. For example, claims may be filed by insureds directly with the insurer, through brokers, or through agents. The insurer may require that the claim be filed on its own proprietary forms, or may accept claims on a standard industry form, such as those produced by the Association for Cooperative Operations Research and Development. Insurer claims departments may employ a large number of claims adjusters supported by a staff of records management and data entry clerks. Typically, incoming claims are classified based on severity and are assigned to adjusters whose settlement authority varies with their knowledge and experience. The adjuster undertakes an investigation of each claim, usually in close cooperation with the insured, determines if coverage is available under the terms of the insurance contract, and if so, the reasonable monetary value of the claim, and authorizes payment.

In managing the claims handling function, insurers seek to provide high levels of accuracy and customer satisfaction. With the Internet, customers are no longer willing to tolerate delays in claims and loss handling process, and expect speedier turn around.

Thus, there are further needs in the art for methods, apparatuses, systems, computer program products, and/or the like for providing speedier claims handling to customers.

BRIEF SUMMARY OF SOME EXAMPLE EMBODIMENTS

Example embodiments provide methods, apparatuses, systems, and computer program products for automatically processing a claim provided by a user.

According to one aspect of the present invention, a method for automatically processing a claim provided by a user is provided. In an example embodiment, the method comprises responsive to receiving a notice of loss associated with a claim of a user, collecting, by at least one processor, a set of customer identity validation data. The method may further comprise determining, by the at least one processor, that the set of customer identity validation data meets a pre-defined identity validation criteria. The method may further comprise responsive to determining that the set of customer identity validation data meets the pre-defined identity validation criteria, accessing, by the at least one processor, current claim evaluation data for the claim. The method may further comprise determining, by the at least one processor and using a predictive model, a set of predictive impact assessment scores associated with the current claim evaluation data. The method may further comprise determining, by the at least one processor, that the set of current claim evaluation data meets pre-defined claim data criteria by comparing the predictive impact assessment scores with a set of impact assessment thresholds. The method may further comprise responsive to determining that the set of current claim evaluation data meets the pre-defined claim data criteria, determining, by the at least one processor, a reactive action to the claim.

In an example embodiment, the method further comprises responsive to receiving the notice of loss associated with the claim of the user, providing, by the at least one processor, a protocol for inputting the set of current claim evaluation data to a user computing entity.

In an example embodiment, the method further comprises accessing, by the at least one processor, a set of historical claim analytics data; and using the set of historical claim analytics data to determine the set of predictive impact assessment scores associated with the current claim evaluation data.

In an example embodiment, the current claim evaluation data comprises a set of Internet of Things (IoT) data provided by an IoT computing entity. In an example embodiment, the set of customer identity validation data comprises a set of IoT data provided by an IoT computing entity.

In an example embodiment, the set of IoT data comprises one or more of: an abnormality alert, a temperature, a time stamp, an indication of opening of a door, an indication of lights turned on/off, an indication of water meter shut off, a water consumption data, or an electrical consumption data.

In an example embodiment, determining the set of predictive impact assessment scores associated with the current claim evaluation data comprises utilizing one or more of: a time stamp, a location data, an indication of peril, an indication of number of rooms affected in a property, an indication of interior affected, an indication of exterior affected, or an indication of standing water in a room.

In an example embodiment, the reactive action comprises one or more of: providing an indication that further assessment is needed, providing a mitigation service, or scoping a loss associated with the claim.

In an example embodiment, scoping the loss associated with the claim further comprises providing a claims scoping camera tool with an augment reality view interface to a user computing entity. In an example embodiment, the method further comprises using a set of coverage mapping to determine a coverage for the claim.

According to another aspect of the present invention, an apparatus is provided. In an example embodiment, the apparatus comprises at least one processor, at least one memory storing computer program code, and at least one user interface. The at least one memory and the computer program code are configured to, with the processor, cause the apparatus to at least responsive to receiving a notice of loss associated with a claim of a user, collect, by at least one processor, a set of customer identity validation data. In an example embodiment, the at least one memory and the computer program code are further configured to, with the processor, cause the apparatus to at least determine, by the at least one processor, that the set of customer identity validation data meets a pre-defined identity validation criteria. In an example embodiment, the at least one memory and the computer program code are further configured to, with the processor, cause the apparatus to at least responsive to determining that the set of customer identity validation data meets the pre-defined identity validation criteria, access, by the at least one processor, current claim evaluation data for the claim. In an example embodiment, the at least one memory and the computer program code are further configured to, with the processor, cause the apparatus to at least determine, by the at least one processor and using a predictive model, a set of predictive impact assessment scores associated with the current claim evaluation data. In an example embodiment, the at least one memory and the computer program code are further configured to, with the processor, cause the apparatus to at least determine, by the at least one processor, that the set of current claim evaluation data meets pre-defined claim data criteria by comparing the predictive impact assessment scores with a set of impact assessment thresholds. In an example embodiment, the at least one memory and the computer program code are further configured to, with the processor, cause the apparatus to at least responsive to determining that the set of current claim evaluation data meets the pre-defined claim data criteria, determine, by the at least one processor, a reactive action to the claim.

In an example embodiment, the at least one memory and the computer program code are further configured to, with the processor, cause the apparatus to at least responsive to receive the notice of loss associated with the claim of the user; and provide, by the at least one processor, a protocol for inputting the set of current claim evaluation data to a user computing entity.

In an example embodiment, the at least one memory and the computer program code are further configured to, with the processor, cause the apparatus to at least access, by the at least one processor, a set of historical claim analytics data. In an example embodiment, the at least one memory and the computer program code are further configured to, with the processor, cause the apparatus to at least use the set of historical claim analytics data to determine the set of predictive impact assessment scores associated with the current claim evaluation data.

In an example embodiment, the current claim evaluation data comprises a set of Internet of Things (IoT) data provided by an IoT computing entity. In an example embodiment, the set of customer identity validation data comprises a set of IoT data provided by an IoT computing entity.

In an example embodiment, the set of IoT data comprises one or more of: an abnormality alert, a temperature, a time stamp, an indication of opening of a door, an indication of lights turned on/off, an indication of water meter shut off, a water consumption data, or an electrical consumption data.

In an example embodiment, determining the set of predictive impact assessment scores associated with the current claim evaluation data comprises utilizing one or more of: a time stamp, a location data, an indication of peril, an indication of number of rooms affected in a property, an indication of interior affected, an indication of exterior affected, or an indication of standing water in a room.

In an example embodiment, the reactive action comprises one or more of: providing an indication that further assessment is needed, providing a mitigation service, or scoping a loss associated with the claim.

In an example embodiment, scoping the loss associated with the claim further comprises providing a claims scoping camera tool with an augmented reality view interface to a user computing entity. In an example embodiment, the at least one memory and the computer program code are further configured to, with the processor, cause the apparatus to use a set of coverage mapping to determine a coverage for the claim.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4:
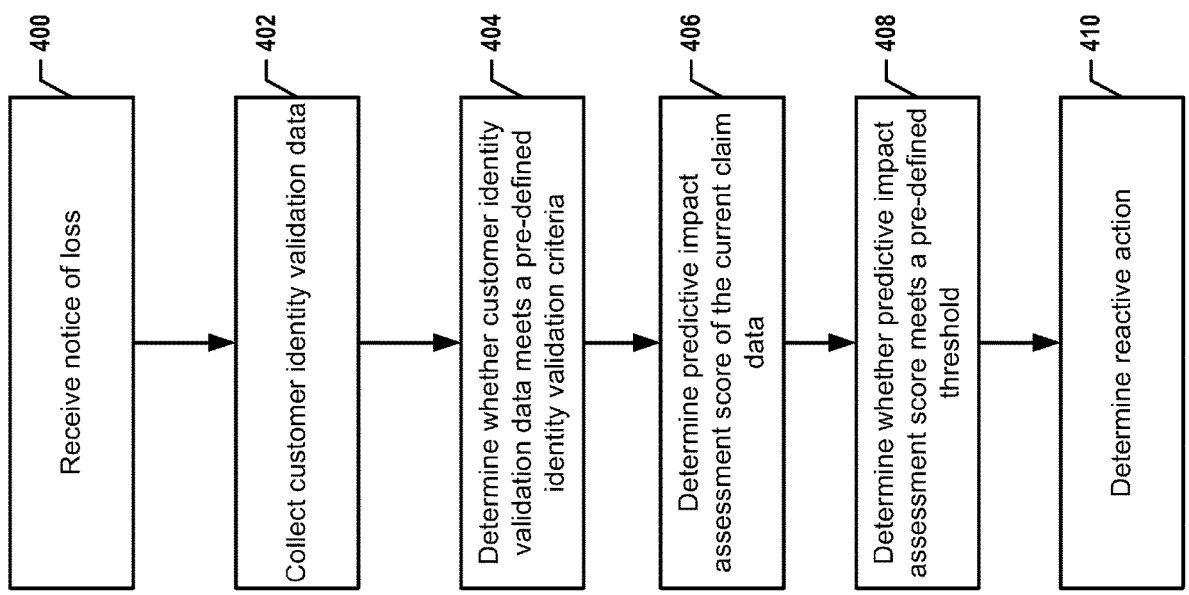

FIG. 4 provides a flowchart illustrating a high-level overview of automatically processing a claim provided by a user, in accordance with an example embodiment.

Figure 5:
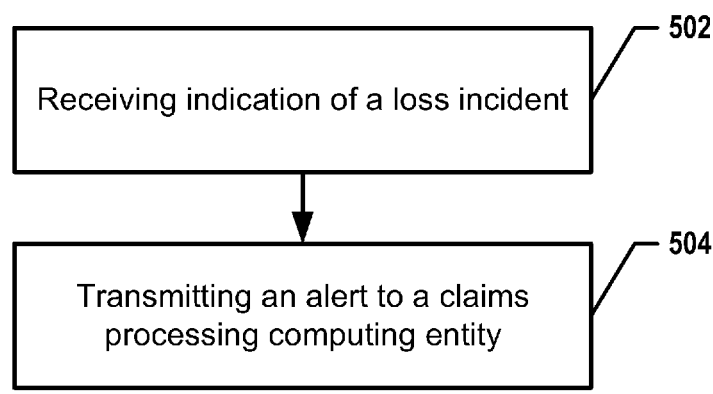

FIG. 5 provides a flowchart illustrating processes and procedures of an Internet of Things computing entity in the event that a loss incident is detected, in accordance with an example embodiment.

FIG. 6 provides a flowchart illustrating processes and procedures for loss scoping, in accordance with an example embodiment.

FIG. 7 provides a flowchart illustrating processes and procedures for utilizing an artificial intelligence image recognition tool to process user provided images in the loss scoping process, in accordance with an example embodiment.

FIG. 8 provides an example coverage mapping that may be used, in one example embodiment, in a coverage determination process.

FIG. 9 provides an example policy form that may be used, in one example embodiment, in the coverage determination process.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like numbers refer to like elements throughout.

Various embodiments are engineered to produce technical solutions including a human-machine interface that facilitates an insured to access an insurance process that is automated. In one embodiment, the human-machine interface includes online software applications that allow customers to start and finish claim completely online. The terms customers and users may be used herein interchangeably. Customer would create or authorize the initial first notice of loss, provide damage details, coverage may be assessed/determined, and settlement/payment via the application directly to bank account. These applications use various technical tools such as artificial intelligence (AI), connected home devices, augmented reality, and other technical features to enable full claims automation. Videos and photos, standard mobile phone capabilities, may be utilized to connect process steps to further the automation.

Modern customers who are exposed to the Internet desire 24/7 access to insurance processes, such as for filing claims and have high expectation that claims are resolved quickly. The legacy insurance computer system and its processes, even for simple claims, may take two to three days or longer to turn around processing of a claim. Researches reveal that time to settlement is an important metric in determining satisfaction of modern customers. Satisfied claims customers have substantially higher retention rate. In addition to benefits from higher retention rates, there are likely efficiency gains from lower claims processing costs. Also, by quickening turnaround of insurance processes, this increases net promoter score of an insurer as a result of customer impact.

The online software applications are engineered to assist the customers to cut cycle time to less than ten minutes. The online software applications also help to impress on the customers a seamless and straightforward insurance process, such as the claims process. The online software applications also help to impress the transparency of the insurance process, including guided online tips for self-service, to impress on the customers that there are movements in the claims process towards resolution.

The automation is engineered to assess coverage and settle a claim speedily and in an effective manner. Smart chat bots, through machine learning or execution of artificial intelligence, in various embodiments, are created as technical solutions to help the human-machine interface, or the online software applications, to connect to the legal computer system and its processes of an insurer, and facilitate speedier execution to quicken the claims process. The automation also accesses connected home devices through the Internet to sense and extract information, which through data science, helps to further automate the insurance process.

Embodiments of the present invention may provide users with a self-service mobile computing based application and/or Internet based portal for providing a notice of loss associated with a claim in the event that the user suffers damage (e.g., "a loss") to his/her real property, personal/business property, loss of use of real or business/personal property, loss of income from business operations, and/or incurs expenses associated with a loss. In various embodiments, the a notice of loss associated with a claim may be provided from a direct report from the customer or user, a home of industrial Internet of Things ("IoT" alert), or an alert from a third party, e.g., independent agent, catastrophe event monitoring service, facility manager, or other proxy authorized by the customer. The terms customer and user are used interchangeably herein. Example embodiments of the self-service mobile computing based application and/or Internet based portal general includes five different stages: 1) first notice of loss ("FNOL"); 2) scope of the loss; 3) coverage of the loss; 4) settlement and payment; 5) repair services.

Examples of technical solutions include the following regarding the instance where an artificial intelligence engine determines whether to deploy emergency mitigation service ("EMS") to help dry the drywall and hardwood flooring. In one embodiment, AI (e.g., including machine learning) may be based on reasoning (e.g., probabilities), and the probability that is used suitably is greater than 50%, but other lower or higher probabilities may be used. If, in another embodiment, the AI is based on knowledge, the pieces of knowledge are searched by the AI and mathematically optimized to access each piece of knowledge to deploy EMS. Using inputs (for example, manually entered or automatically collected data (e.g., water/moisture sensor), computer vision, and/or the like) AI would assess moisture levels and use logic and algorithm to determine whether EMS is needed. Examples of technical solutions also include utilizing an AI to scoping a loss related to a claim.

Examples of technical solutions also include utilizing Augmented Reality (AR) technology to show the customer how to gather photos and video. An algorithm with step by step instructions on how a customer gathers photos and videos is provided. Envision the phone camera screen with an overlay/superimposed step by step guide directing the policyholder what and how to scope the damages and claim. Example embodiments of the present invention provide technical solutions to various other technical problems are described in more detail below.

I. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Figure 1:
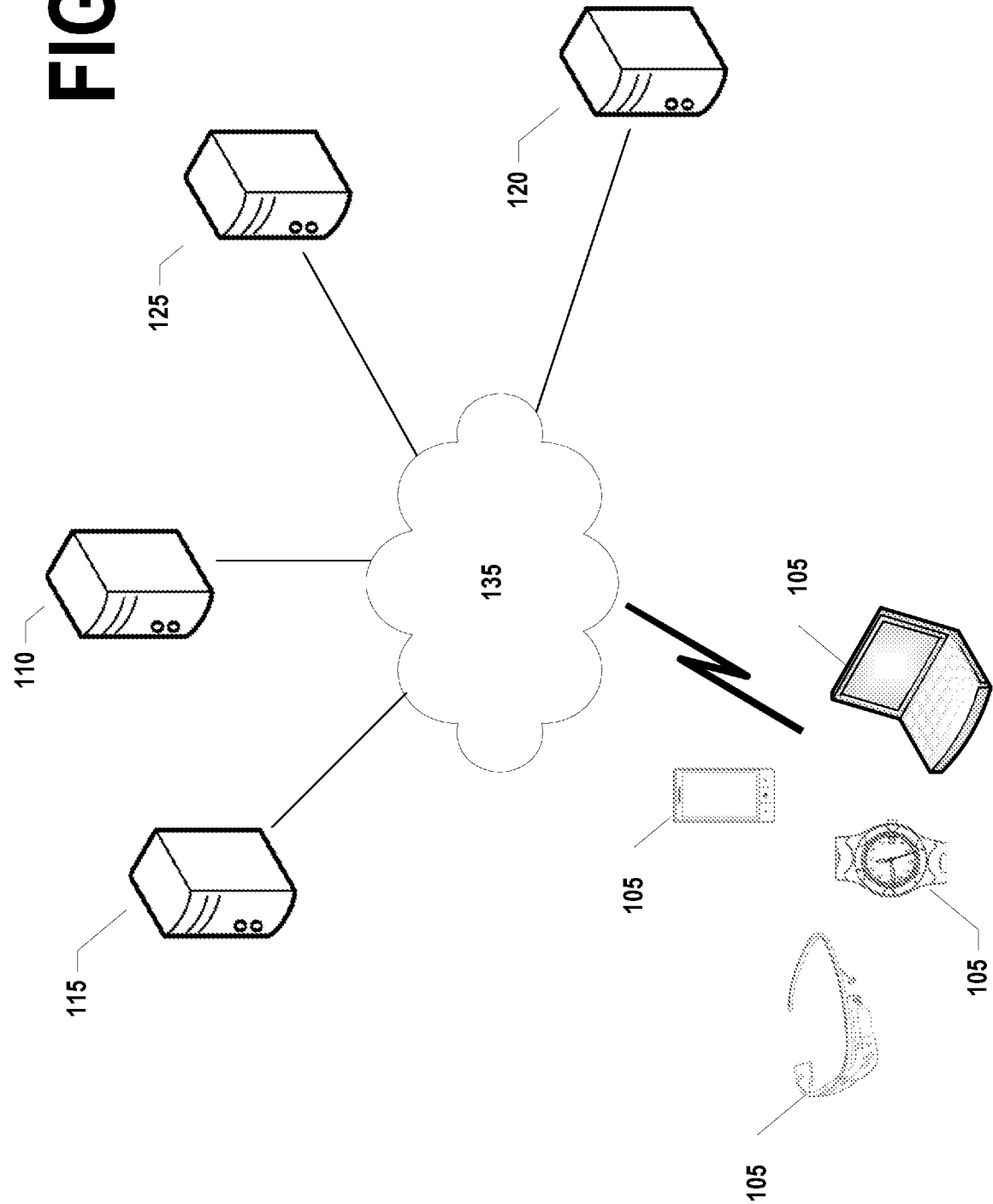
FIG. 1 is a diagram of a system that can be used to practice various embodiments of the present invention.

FIG. 1 provides an illustration of a system that can be used in conjunction with various embodiments of the present invention. As shown in FIG. 1, the system may include one or more user computing entities 105, one or more IoT computing entities 110, one or more external information/data computing entities 115, one or more claims processing computing systems 120, one or more networks 135, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

a. Exemplary Claims Processing System

Figure 2:
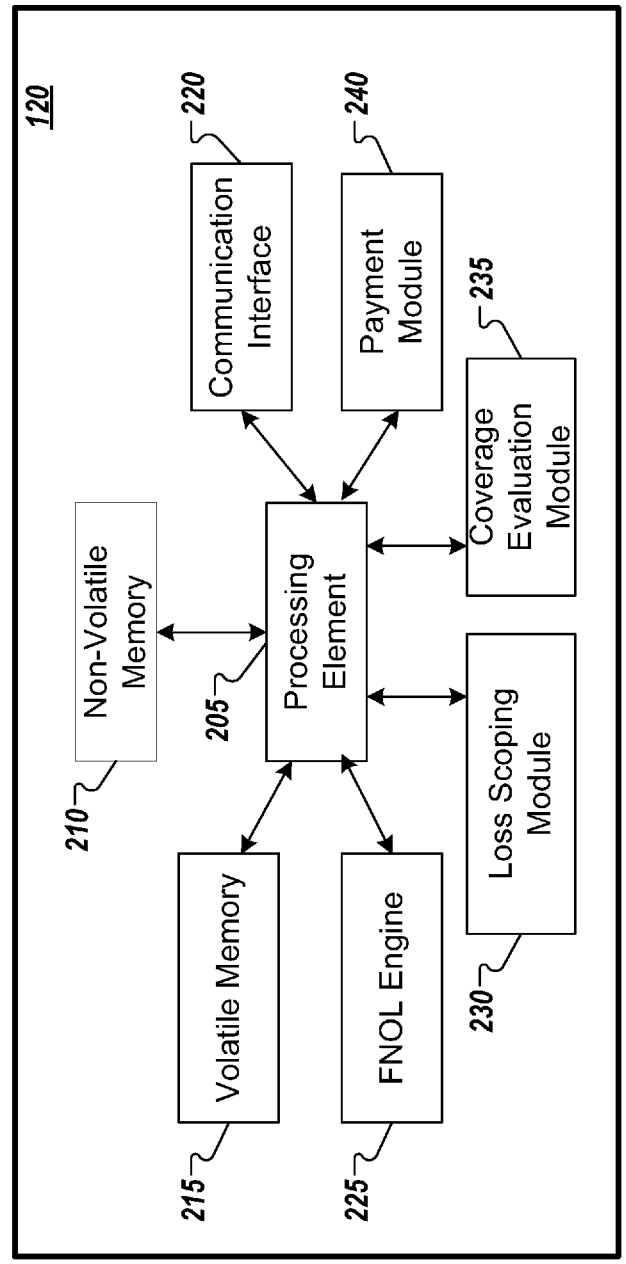
FIG. 2 is a schematic of a claims processing system in accordance with certain embodiments of the present invention.

FIG. 2 provides a schematic of a claims processing system 120 which may be implemented with a cognitive engine according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, headsets, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the claims processing system 120 may also include one or more communications interfaces 220 for communicating with various computing entities, such as by communicating data, content, information, and/or similar terms used herein interchangeably that can be transmitted, received, operated on, processed, displayed, stored, and/or the like. For instance, the claims processing system 120 may communicate with user computing entities 105, IoT computing entities 110, external information/data computing entities 115, and/or the like.

As shown in FIG. 2, in one embodiment, the claims processing system 120 may include or be in communication with one or more processing elements 205 (also referred to as processors, processing circuitry, and/or similar terms used herein interchangeably) that communicate with other elements within the claims processing system 120 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the claims processing system 120 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database. For example, the claims processing system 120 may store a historical claim analytics database, coverage policy database, a customer profile database, a third party profile database, and/or other database(s).

In one embodiment, the claims processing system 120 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205. Thus, the databases, database instances, database management system entities, data, applications, programs, program modules, scripts, source code, object code, byte code, compiled code, interpreted code, machine code, executable instructions, and/or the like may be used to control certain aspects of the operation of the claims processing system 120 with the assistance of the processing element 205 and operating system.

As indicated, in one embodiment, the claims processing system 120 may also include one or more communications interfaces 220 for communicating with various computing entities, such as by communicating data, content, information, and/or similar terms used herein interchangeably that can be transmitted, received, operated on, processed, displayed, stored, and/or the like. For instance, the claims processing system 120 may communicate with computing entities or communication interfaces of the user computing entity 105, IoT computing entity 110, external computing entity 115, and/or the like.

As indicated, in one embodiment, the claims processing system 120 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the claims processing system 120 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The claims processing system 120 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like. In an example embodiment, a claims processing system 120 may communicate with one or more user computing entities 105, and/or other computing entities, via low energy Bluetooth, ZigBee, z-wave, or other short or long range communication protocol.

As will be appreciated, one or more of the claims processing system's 120 components may be located remotely from other claims processing system 120 components, such as in a distributed system. Furthermore, one or more of the components may be combined and additional components performing functions described herein may be included in the claims processing system 120. Thus, the claims processing system 120 can be adapted to accommodate a variety of needs and circumstances.

The claims processing system 120 may include or have access to an FNOL engine 225 configured to process notification of a claim in the event that a user suffers loss and provides notice of loss and/or a claim manually or automatically. In some embodiments, the FNOL engine may receive notice of loss and/or a claim via direct report from users, for example via user computing entity 105. In some embodiments, the FNOL engine may also receive a notice of loss automatically sent by an IoT computing entity 110. Alternatively or additionally, the FNOL engine may also receive notice of loss from an independent agent, catastrophe event monitoring service, facility manager, or other proxy authorized by customer, for example via external computing entity 115.

The claims processing system 120 may also include or have access to loss scoping module 230 configured to scope loss, e.g., determine the extent of damage, cost required to repair or replace the damaged property, and/or accounting of any ancillary loss related to the damage associated with the claim received by the FNOL engine 225. The loss scoping module 230 may use data from a variety of sources to scope loss associated with the claim received by the FNOL engine 225. For example, the loss scoping module 230 may utilize user reported data such as digital images, digital renderings of documents such as receipts or other identifying materials, digital video, digital audio recordings. The user reported data may be previously requested by the FNOL engine 225 or other modules of the claims processing system 120. The loss scoping module 230 may also utilize IoT data provided by IoT computing entity 110. The loss scoping module 230 may also third party data provided by third parties via external computing entity 115. Example third party data include data provided by independent adjuster, contractor, contents inventory/pricing vendor, UAV/Aerial imagery, satellite imagery, specialty service vendor, specialty imagery vendor, and other third parties.

The claims processing system 120 may also include or have access to coverage evaluation module 235 configured to determine the way in which a set of insurance policies associated with the user would be applied to the claim received by claims processing system 120. For example, coverage evaluation module 235 may be configured to determine acceptance or denial of coverage for the loss either in whole or in part, application of limits and deductibles, and other activities which either allow or restrict compensability based on the specific insurance policy and its individual components on which a claim has been made. In some embodiments, the coverage evaluation module 235 may be pre-programmed with available insurance policy forms, endorsements, limits, schedules, and other related instruments.

The claims processing system 120 may also include or have access to payment module 240 configured to present a user, for example by sending data to user computing entity 105, an itemized list of items that were covered and not covered. The payment module 240 may also process payment to the claims provided by the customer. Payments may be in a variety of forms, such as via debit cards, credit cards, direct credits, direct debits, cash, check, money order, Internet banking, e-commerce payment networks/systems, virtual currencies, incentive or reward points, and/or the like. Such payments may be made using a variety of techniques and approaches, including through NFC technologies and other contactless payment systems. Further, such payment technologies may include other electronically enabled payment methods.

b. Exemplary User Computing Entity

Figure 3:
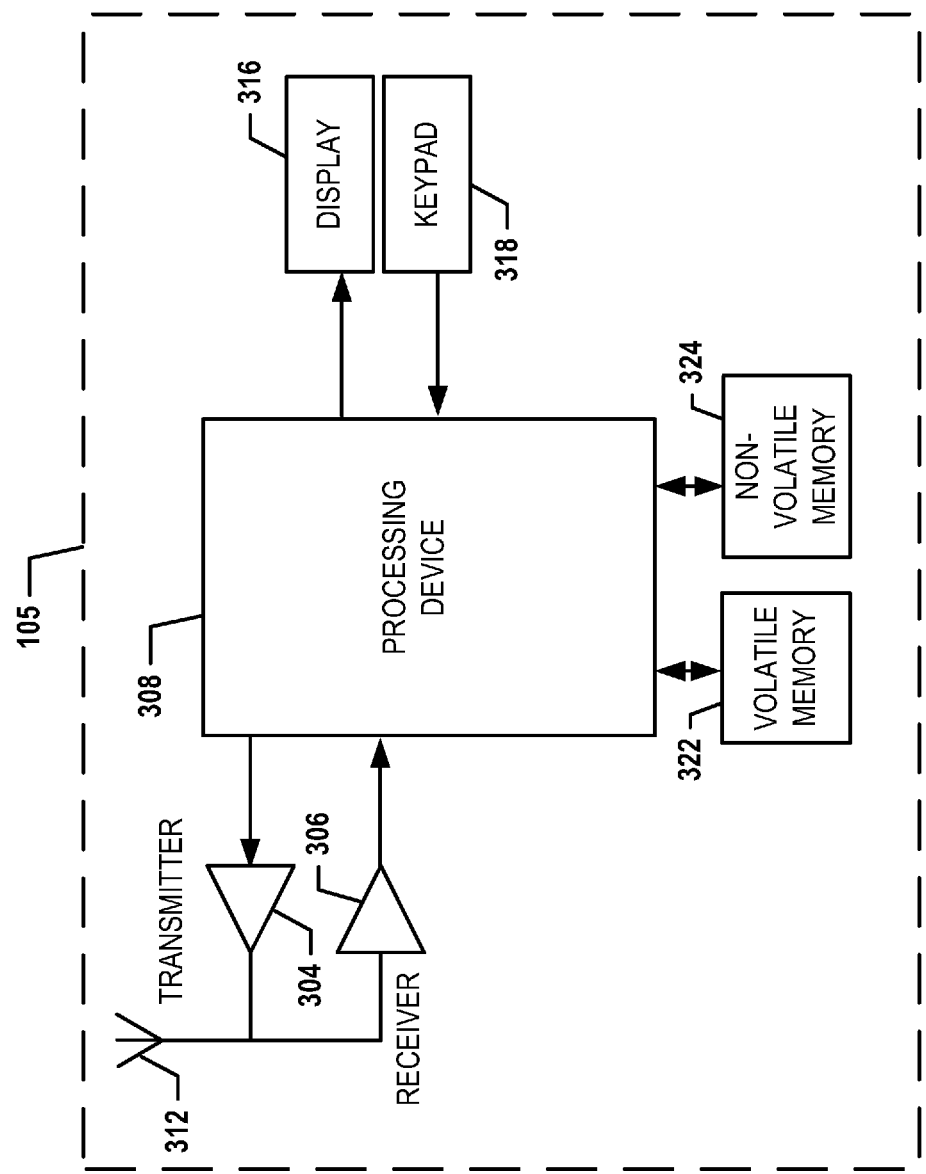
FIG. 3 is a schematic of a user computing entity in accordance with certain embodiments of the present invention.

FIG. 3 provides an illustrative schematic representative of a user computing entity 105 that can be used in conjunction with embodiments of the present invention. In one embodiment, the user computing entities 105 may include one or more components that are functionally similar to those of the claims processing system 120 and/or as described below. In general, a user computing entity 105 is a computing entity operated by and/or on behalf of a user. In various embodiments, a user may be a customer who contracts services, such as insurance coverage, from one or more providers through the platform provided by the claims processing system 120. In various embodiments, a user may be insurance customer of an insurance provided by an insurance provider associated with the claims processing system 120.

As shown in FIG. 3, a user computing entity 105 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as claims processing system 120, and/or the like. In this regard, the user computing entity 105 may be capable of operating with one or more air interface standards, communication protocols, modulation types, and access types. More particularly, the user computing entity 105 may operate in accordance with any of a number of wireless communication standards and protocols. In a particular embodiment, the user computing entity 105 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 105 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 105 can also download changes, add-ons, and updates, for instance, to its firmware, software (e.g., including executable instructions, applications, program modules), and operating system.

The user computing entity 105 may also comprise an interactive user interface (that can include a display 316 coupled to a processing element 308). For example, the interactive user interface may be an application, a browser, a user interface, an input user interface, a dashboard, a webpage, and/or similar words used herein interchangeably executing on and/or accessible via the user computing entity 105 to interact with and/or cause display of information. The user interface can comprise any of a number of devices allowing the user computing entity 105 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 105 and may include a full set of alphabetic keys or set of keys that may be activated to provide a full set of alphanumeric keys. In addition to providing input, the user interface can be used, for example, to activate or deactivate certain functions, such as screen savers and/or sleep modes. Through such inputs the user computing entity can collect contextual information/data as part of the telematics data.

The user computing entity 105 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 105. For example, the user computing entity 105 may store a map information/data database, a boundary information/data database, user (e.g., customer and/or provider) profile information/data, and/or other information/data corresponding to the platform provided by the claims processing system 120 within volatile storage or memory 322 and/or non-volatile storage or memory 324.

c. Exemplary IoT Computing Entity

In general, an IoT computing entity 110 is a hub associated with one or more IoT computing units that each associated with a physical object such as a building structure, equipment, or other insured property. The IoT computing units may be an embedded sensor such as a smoke, moisture, motion, acoustic and similar detectors which collect information and have network connectivity enabling the transfer of the data that is collected to an onsite or cloud based hub IoT computing entity 110.

In one embodiment, the IoT computing entity 110 may each include one or more components that are functionally similar to those of the claims processing system 120 and/or the user computing entity 105. For example, in one embodiment, each of the IoT computing entity 110 may include: (1) a processing element that communicates with other elements via a system interface or bus; (2) transitory and non-transitory memory; and (3) a communications interface. These architectures are provided for exemplary purposes only and are not limiting to the various embodiments.

d. Exemplary External Computing Entity

In general, an external computing entity 115 is a computing entity operated by and/or on behalf of a third party that provides information/data such as weather/catastrophe monitoring services, third party claim analytics data, third party imagery, and the like to the claims processing system 120.

In one embodiment, the external computing entity 115 may each include one or more components that are functionally similar to those of the claims processing system 120 and/or the user computing entity 105. For example, in one embodiment, each of the external information/data computing entities 115 may include: (1) a processing element that communicates with other elements via a system interface or bus; (2) an interactive user interface; (3) transitory and non-transitory memory; and (4) a communications interface. As previously noted, the external computing entity 115 may comprise an interactive user interface. For example, the interactive user interface may be an application, browser, user interface, dashboard, webpage, and/or similar words used herein interchangeably executing on and/or accessible via the external computing entity 115 to interact with and/or cause display of information/data from the claims processing system 120 and/or the user computing entity 105, as described herein. These architectures are provided for exemplary purposes only and are not limiting to the various embodiments. For example, in one embodiment, the external computing entity 115 may include an IoT computing entity 110 if the IoT computing entity 110 is operated by a third party.

e. Exemplary Networks

In one embodiment, any two or more of the illustrative components of the architecture of FIG. 1 may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), metropolitan area networks (MANs), wide area networks (WANs), local area networks (LANs), or personal area networks. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. EXEMPLARY SYSTEM OPERATION

In various embodiments, the claims processing system 120 is configured to automatically process a claim provided by a user via a user computing entity 105 and/or a website, portal, IoT entity, and/or the like. For example, a user may access an application, website, portal, and/or the like (e.g., via the user computing entity 105) to provide a claim to the claims processing system 120. Alternatively, claim information may be automatically provided/collected.

FIG. 4 provides an example overview of automatically processing a claim provided by a user using claims processing system 120. Since the claims processing system 120 can automatically process a claim, the protocol offered by the claims processing system 120 may be referred to as a self-service process and is described herein in such a context.

a. FNOL

At step/operation 400, a user may provide a claim which serves as a notice of loss and/or a separate notice of loss via a user computing entity 105 and/or a website, portal, and/or the like accessible via the user computing entity 105 to the claims processing system 120. The notice of loss may be processed by the FNOL engine 225. As will be recognized, in various embodiments, the a notice of loss associated with a claim may be provided from a direct report from the customer or user via the user computing entity 105, an IoT alert provided by an IoT computing entity 110, or an alert from a third party (e.g., independent agent, catastrophe event monitoring service, facility manager, or other proxy authorized by the user via external computing entity 115). In some embodiments, the notice of loss may be provided from various channels and procedures such as a website, a mobile app, reporting hotlines, web portals, and other digital entry points. The enabling technology used would be based on customer preference.

Responsive to receiving the notice of loss associated with the claim associated with the user, at step/operation 402, a module in the claims processing system 120, such as FNOL engine 225, may collect a set of customer identity validation data. The set of customer identity validation data may include security questions established in insurance process, voice biometrics and fingerprint information, and other commercially availability methods and information. In some embodiments, the set of customer identity validation data also includes data provided by IoT computing entity 110.

In some embodiments, the security questions may be guided by the intelligent virtual assistant ("IVA") through claims processing system 120 via a user platform. The user platform may be pre-programmed with available insurance policy forms, endorsements, limits, schedules, and other forms. The language of these forms may be structured and mapped against a comprehensive list of incidents that contributes to loss. The IVA questioning may have integrated contingency based logic where the answer to an initiating question would determine the subsequent question that is to be asked of the customer. This contingency based process may be enabled by linking specific insurance policy provisions which impact coverage for various incidents and common loss variables as determined by historical proprietary and third party claim data stored in, or otherwise gathered by, the claims processing system 120.

After collecting the set of customer identity validation data, at step/operation 404, a module in the claims processing system 120, such as FNOL engine 225, may determine whether the set of customer identity validation data meets pre-defined identity validation criteria. In some embodiments, pre-programmed business rules may assess each field, individually and/or collectively, in the customer identity validation data as to the level of adequacy of information provided to make a coverage determination for the loss, potential scope of damages, and potential indicators of claim complexity.

In some embodiments, example identity validation criteria include assigning a weighting to each of the customer identity validation data such as, answers to security questions established in insurance process, voice biometrics and fingerprint information, and other commercially availability methods and information. If an aggregated weighting of the identity validation data exceeds a pre-defined threshold, the identity validation criteria is satisfied.

In some embodiments, each field in the customer identity validation data may be assessed and assigned relative weighting based on historical proprietary and third party claim analytics data that correlate a set of potential answers for the field with eventual claim outcomes. Structured responses for each field may be assigned a numeric value depending on their potential impact on the claim. Example data assessed and analyzed may include fields illustrated in the chart below:

Loss Detail:
Date/Time
Incident
Location
Number of Rooms
Number of Floors
Building(s)/Contents/LOU or BI/Multiple
Interior/Exterior/Both
Standing Water
Flooring Affected
Number of Flooring Affected The FNOL engine 225 may aggregate the values from the individual field assessment to determine if the information provided could advance the claim to the next phase of processing, or if additional information would need to be gathered. If the aggregated score fell within a certain range determined to be adequate, the set of customer identity validation data meets the pre-defined identity validation criteria and the claim may progress. If the aggregated score fell within a predetermined range that was not adequate for progression, the set of customer identity validation data does not meet the pre-defined identity validation criteria and additional information may be requested.

Responsive to determining that the set of customer identity validation data meets the pre-defined identity validation criteria, at step/operation 406, the claims processing system 120 is configured to collect and/or assess a set of current claim evaluation data. In some embodiments, the claims processing system 120 may collect the set of current claim evaluation data by providing a user with a channel to provide the set of current claim evaluation data. For example, the user may be provided with option to continue in a self-service protocol or mobile app, or route the claim to be handled by live person. The user may also be provided a specific claim identifier/number and general information explaining the claim process in the form of video and/or written format which is tailored to his/her type of policy and circumstances of his/her loss. If additional information would be required, instructions may be provided to the user as to what information is needed, and options, including the protocols described above in conjunction with providing the notice of loss, to provide information that would form the current claim evaluation data.

b. IoT and IoT Alerts

In some embodiments, the current claim evaluation data may be also collected from IoT computing entity 110. Users who opt in for an IoT service may have an interconnected network of physical objects embedded with IoT computing units such as their building structures, equipment, and other insured property. An IoT computing entity 110 is a hub associated with one or more IoT computing units that each associated with a physical object such as a building structure, equipment, or other insured property. The IoT computing units may be, include, or be communication with embedded sensors such as a smoke, moisture, motion, acoustic and similar detectors which collect information and have network connectivity enabling the transfer of the data that is collected to an onsite or cloud-based hub IoT computing entity 110. The IoT computing entity 110 may be operated by the same operator as claims processing system 120, or operated by a third party as part of external computing entity 115.

In some embodiments, the IoT computing units may be installed and monitored by third party service providers, such as security monitoring services, smart factory service providers, environmental management entities, or the like. Unique identifiers of specific IoT computing units (serial numbers, names, and/or the like) may be recorded and associated with specific insurance policies and stored in a database within, or associated with, the claims processing system 120. IoT computing units data include abnormality alerts (e.g., water detection), temperature, time stamp, opening/closing of doors, when lights were turned on/off, water meter shut off/turn on data, water consumption, electrical consumption, and/or the like In some embodiments, for IoT computing units installed on buildings, the IoT computing units may be sensors embedded in buildings to monitor environmental conditions for phenomena such as water exposure, smoke, fire, impacts, extreme movement, acoustical indicators of glass breakage, and others which may indicate that damage to the building has occurred. In some embodiments, IoT computing units may be installed throughout the structure to the extent possible and with their specific placement mapped by recording the serial number or other identifier of the sensor, the relative direction of the wall or ceiling on which they are installed (North, South, East, West), the room in which they are placed, and/or the level in which the corresponding room is located. When an incident is detected, data from the IoT computing unit is transmitted to the IoT computing entity 110. The IoT computing unit mapping enables the location of any detected phenomena to be pinpointed within each room of the building, as well as the extent to which the building is affected.

In some embodiments, for IoT computing units installed on buildings, equipment, machinery, appliances, or other similar property, the IoT computing units may monitor the same environmental phenomena as building-installed IoT computing units but may also monitor performance of the equipment for operating anomalies and failure. Performance monitoring may involve continuous collection of a series of data points which may include temperature, vibration, fluid levels, pressure, output timing, electrical current, and others. The performance monitoring data may be transmitted to other entities on a continuous basis, at specific intervals, and/or in response to certain triggers. When a potential loss incident (e.g., a damaging event or breakdown of the equipment) is detected, an alert indicating such a loss incident may be transmitted to the IoT computing entity 110 with the associated data.

As illustrated in FIG. 5, upon receiving an indication of a loss incident at step/operation 502, the IoT computing entity 110 may transmit an alert (or other notification) with the collected IoT computing unit data to the claims processing system 120 at step/operation 504. The format of the alert/notification may vary depending on the types of devices used the customers. The alert may include one or more of: audible signals such as alarms at the location of the affected property, control system notifications, digital messages to desktop or mobile devices, phone notifications, or the like—all of which may be considered as user computing entities 105.

In some embodiments, the IoT computing entity 110 may also convert the collected IoT computing unit data to a data format that could populate structured intake fields within an intake module within the claims processing system 120. The structured intake fields may include items such as the user identifier, date of loss, location of loss, an incident classification identifier, affected business or personal property identifier, extent of damage indication or classification, and other details. A set of pre-programmed business rules may assess each intake field as to the level of adequacy of information provided, its potential impact on the claim, and potential indicators of claim complexity. In some embodiments, each intake field may be assessed and assigned relative weighting based on historical proprietary and third party claim analytics data received from external computing entity 115 that correlate a set of potential answers for the intake field with eventual claim outcomes. Structured responses for each intake field may be assigned a numeric value depending on their potential impact on the claim.

c. Reactive Actions

After collecting and/or assessing the set of current claim evaluation data, the claims processing system 120 may determine, at step/operation 406, a set of predictive impact assessment scores associated with the current claim evaluation data using one or more predictive models (e.g., trained machine learning models). In some embodiments, the FNOL engine 225 may generate the predictive impact assessment scores by assessing and assigning relative weighting based on historical proprietary and third party claim analytics data received from external computing entity 115 that correlate a set of potential answers for the intake field with eventual claim outcomes. Structured responses for each intake field may be assigned a numeric value depending on their potential impact on the claim.

After generating the predictive impact assessment scores, at step/operation 408, the FNOL engine 225 may determine whether the set of current claim evaluation data meets pre-defined claim data criteria by comparing the predictive impact assessment scores with a set of impact assessment thresholds. For example, for a claim related to building damage, an impact assessment threshold smaller than 0.5 because of lack of number of rooms affected and standing water information indicates that the set of current claim evaluation data does not meet pre-defined claim data criteria.

Alternatively, in some embodiments, the FNOL engine 225 may aggregate the predictive impact assessment scores first then compare the aggregated score with an impact assessment threshold. If the predictive impact assessment scores satisfy the pre-defined claim data criteria, the claims processing system 120, at step/operation 410, may determine a reactive action to the claim. In some embodiments, the type of reactive action to be taken may be dependent on comparing the set of predictive impact assessment scores with a set of pre-defined action thresholds. The action thresholds are set based on historical internal and third party claim data which have been determined to indicate the likely immediate needs of a claim based on the information received, and the outcome of a claim when channeled into particular scoping paths. In some embodiments, the claims processing system 120 may perform an autonomous needs assessment to determine whether immediate mitigation services need to be dispatched to the user. For example, an emergency mitigation action threshold bigger than 0.7 may indicate that emergent mitigation services need to be dispatched to the loss location.

In some embodiments, based on the predictive impact assessment score associated with the corresponding incident, the claims processing system 120 may take the reactive action of initiating emergency water, fire, and other mitigation services to be dispatched to the loss location via established application programming interface (APIs) with the providers. The mitigation service may be provided by a third party service vendors and the claims processing system 120 may be configured to initiate such a service via an established protocol between the claims processing system 120 and an external computing entity 115 operated by the third party configured to process such a service request. In some embodiments, for a water related incident in a physical property, example factors considered by the claims processing system 120 to generate predictive impact assessment score may include presence of standing water, number of rooms impacted, cause of the incident, floors affected, indication of any flooring affected, and number of rooms with continuous flooding. As will be recognized, the formulas and algorithms used to calculate the predictive impact assessment scores may be based on predictive machine learning models generated in connection with claims processing system 120.

As will be recognized, the predictive model(s) may utilize historical data as training data. Example data utilized in historical data may include the severity of claims, timing of EMS deployment, and data from an emergency mitigation vendor (e.g., number of fans, length running, moisture/humidity levels, and other data). For non-water related incidents such as plumbing, tarping, smoke, equipment repair, and the like, similar predictive machine learning models may be utilized.

In some embodiments, third party data such as police and other reports that include building permit history can be autonomously ordered based on the score and associated incident to provide information that can validate various facts of the loss as the claim develops. If an incident associated with the claim is identified as associated with a criminal activity, the claims processing system 120 will cross reference data with the current claim evaluation data and third party criminal data to identify anomalies. If no police reports are available, the user may be prompted with option to file a police report through a claims processing application, such as one provided via a portal where the user submitted the claim. Permit data may also help assess aging, depreciation, and other information. Predictive machine learning models may also be utilized in validating facts of the incident/loss/claim.

d. Fraud Review

In some embodiments, the claims processing system 120 is configured to generate a predictive fraud review score (e.g., using one or more predictive models) which indicates a degree of probability that an act of fraud has occurred in each of the intake fields based on proprietary and third party historical data. If the predictive fraud review score meets a pre-defined threshold that would trigger a fraud review, additional fraud analytics tools can be applied to the captured data. In some embodiments, the fraud analytics tools provide analysis of loss history, criminal history, property history, loss description attributes, and other elements using historical proprietary and third party data which has been correlated with various acts of fraud. In some embodiments, audial tools that provide voice analysis include speech patterns, voice pitch and volume, sentiment, and other attributes may be applied to verbal statements provided by the customer and recorded at intake may be utilized to provide. The audial tools use detailed voice analytics based on generally accepted scientific research and historical data to identify potential indicators of fraud. An autonomous scoring system would aggregate the values from the fraud review to determine if additional review is needed. If the aggregated predictive fraud review score did not fall within a predetermined range considered to be adequate, the claim could progress. If the fraud review aggregated score fell within a predetermined range that was indicative of fraud, the claim could be routed accordingly. Special investigation or other internal teams can be assigned to review or perform other services for the claim based on the predictive fraud review score and associated incident. If additional review determined to be needed, the claims processing system 120 may provide an indication indicating that further assessment is needed to the user computing entity 105, such as via providing a fraud review interface.

e. Loss Scoping

In some embodiments, the claims processing system 120 may perform a loss scoping reactive action based on the predictive impact assessment score associated with the corresponding incident. The loss scoping may include a determination of the extent of damage, the cost required to repair or replace the damaged property, and an accounting of any ancillary loss related to the damage.

As illustrated in FIG. 6, to perform loss scoping, a module in the claims processing system 120, such as loss scoping module 230, is configured to, at step/operation 602, collect claims scoping data. In some embodiments, claims scoping data may be provided by a user via a user computing entity 105, provided by a third party via an external computing entity 115, or via a IoT computing entity 110. A source providing claims scoping data may be referred as a scoping path.

In some embodiments, each scoping path may have defined criteria which would have to be met by the information extracted to ensure that an accurate repair scope can be developed. The criteria may be defined based on historical proprietary or third party claim data which indicate the level of information necessary to develop an accurate repair scope. The criteria may vary based on the type of loss, property involved, and loss attributes identified previously. Example defined criteria applied to physical structure of related claims may include room or location indicators, size of rooms or locations involved, types of materials contained within the rooms, quantity of affected materials in the rooms, and/or the like. Criteria applied to business/personal property related claims may include make, model, manufacturer, quantity of items, and others. Structured digital fields that capture these criteria may be populated by information extracted via various different capture methods described in conjunction with example claim scoping data collected.

Example current claim scoping data include data provided by a user including digital images, digital renderings of documents such as receipts or other identifying materials, digital video, digital audio recordings may be requested of the user as a part of the intake process using tools (smartphones, cameras, audio recorders, and/or the like) to which the user may have access to. Transfer of the media may be facilitated via email, weblink, text, IVA, chatbot, or native/web app associated with the claims processing system 120. Annotation features for each photo, video, audio, and/or document may be enabled for the user as the user upload each item so that particularly relevant data may be extracted from the image.

In some embodiments, the loss scoping module 230 may also utilize voice to text conversion tools to create a digital transcript of any audio provided. For example, the loss scoping module 230 may utilize optical character recognition ("OCR") tools to convert text from uploaded estimates, inventories, invoices, damage descriptions, and/or the like into a structured format for processing.

In some embodiments, the loss scoping module 230 may also utilize AI image recognition tools to be applied to any imagery collected to fully identify specific materials (e.g., drywall, insulation, carpet, and/or the like), contents items, equipment, and other items as illustrated in FIG. 7.

At step/operation 702, the AI engine in the loss scoping module 230 is configured to access one or more captured images provided by a user. At step/operation 704, the AI engine in the loss scoping module 230 may be configured to compare the captured images to a bank of available images which have been learned by or pre-programmed into the AI engine with structured descriptions of the image subject. For example, when a subject in the captured image matches the subject in the learned or pre-programmed image, a description of the item may be produced. The AI engine in the loss scoping module 230 may also utilize additional data points such as OCR to add further details to the item description for heightened detail at step/operation 706. In addition, the AI engine in the loss scoping module 230 may also compare user provided annotations, audio transcripts, and structured data from converted documents to the generated AI identification to enhance accuracy. Characteristics of damage, such as deviations in shading, shape, and other physical characteristics which indicate damage, may also be learned by or pre-programmed into the AI engine in the loss scoping module 230 based on proprietary or third party imagery and compared with the captured images at step/operation 708. After the AI engine in the loss scoping module 230 compares the previously identified materials (drywall, paint, insulation, and/or the like) and any contents items to the damage characteristics, the loss scoping module 230 is configured to generate an estimate on the scope of damage to be generated at step/operation 710. The estimate on the scope of damage may be part of the loss estimate generated at step/operation 604. Timing of the image capture and estimate scoping may be dependent on environmental conditions or completion of mitigation and other site stabilization activities to ensure the damage can be clearly captured in total.

In some embodiments, claims scoping digital tools which are coded to facilitate the gathering of claim scoping data may be provided to a user computing entity 105 via email, weblink, text, IVA, chatbot, or native/web app. The tools may be configured to use the camera, audio recording systems, accelerometers, gyroscopes, positioning, and other data systems within the mobile device.

In some embodiments, a camera tool included in the claims scoping digital tools may be programmed to provide an augmented reality ("AR") view interface through the screen display which enables capture of the best quality image, determination of item/room scale, identification of damage, reference, item brand names, item model number, and other data. The display may provide instructions to the user on the system functionality and how to capture optimal imagery for the tool to process. The camera tool may also provide instruction on when imagery may be captured to ensure mitigation and other site stabilization activities do not skew the accuracy of the scope. The camera tool may be configured to cause a screen to display a digital image frame which may be color coded to indicate when the optimal resolution of the target object can be captured based on the distance to target, lighting, angle and other elements. In some embodiments, a drawing tool included in the claims scoping digital tools may be provided along with the cameral tool to enable areas of damage or other reference points to be identified. The instructions to the user may be designed to ensure adequate imagery was gathered to allow for photogrammetry based 3d modelling, triangulation of reference points to develop measurements, and ingestion of other positioning information to accurately determine size and scale of target surfaces/items. The camera tool may be configured to collect room dimension and spatial data that maps desired areas. The camera tool may also include vision algorithms to generate floor plans with room measurements.

In some embodiments, an audio recording tool included in the claims scoping digital tools may be provided alongside the camera tool to allow the user to provide descriptions of target surfaces or items. The descriptions may include items such as a surface identification (wall, floor, ceiling, and/or the like) type of material (drywall, carpet, wood, and/or the like), whether surfaces are painted, and other details. Voice to text conversion tools populate the description fields in an augmented reality ("AR") display in the user computing device where the digital tools are provided. Depending on the incident, room, or content, an augmented reality powered overlay of the photo that is desired may be presented on the user's mobile device. For example, the overlay on the screen may outline the image. User may accordingly guide device to capture image to fit approximately within that outline. For example, User could be directed to capture close up and wide-screen image of the same damage area. Outlines for the AR item may be created from both liberty photo stock and third party imagery. AR would further walk step by step through photo and video documentation phase. User would also be able to access or upload photo from the devices gallery or third party photo sharing/storage services.

The camera tool may also utilize an AI based image recognition tool to identify images and assign a classifier (e.g., machine learning classifier) to the captured images. For example, a picture of a damaged drywall may be classified as a "damaged dry wall" and a picture of a damaged grill may be classified as a "damaged grill".

In some embodiments, the AI based image recognition tool may be trained using a combination data sourcing techniques, data preparation techniques, and data annotation data techniques. The data sourcing may include internal data such as captured images. The data preparation may include normalization, cleansing, transformation and enrichment. The data annotation may include setting ground truth. A training set, a testing set and a validation set may be formed from the sourced, prepared and annotated data.

In some embodiments, the AI based image recognition tool may analyze each photo captured to identify the item and check for fraud. If the AI based image recognition tool determines that there is a low confidence in the recognition of the item or failed to identify the item, the camera tool may prompt the user to type, speak (speech-to-text), or use per generated suggestions the user can select from. The user generated classification may be fed back into the classifier to improve future image recognition.

The AI based image recognition tool may check for potential fraud in the captured images by analyzing metadata on the images, checking against public or private third party images sources (including search engine, social media and others). In some embodiments, the AI based image recognition tool may compare GPS metadata associated with the captured image with address of the insured property associated with the claim. In some embodiments, the AI based image recognition tool may also check time stamp data to determine whether the image is captured before or after a date of loss asserted in the claim.

In some embodiments, the camera tool may guide a user through a process of recording video of the damages and guide user through providing verbal summary and explanation of the damages. An AI tool may be used to transcribe speech-to-text and analyze tone of voice for sentiment and fraud. The AI tool may be a voice analytics tool provided by a third party. All data captured and generated by the camera tool may be transmitted to the claims processing system 120 along with a claim identifier identifying the claim where the data is associated with.

Example current claim scoping data may also include data received from third party such as independent adjuster, contractor, contents inventory/pricing vendor, UAV/aerial imagery, satellite imagery, specialty service vendor, specialty imagery vendor, or the like. Example current claim scoping data may also include data generated by previously described IoT computing units and provided by IoT computing entity 110. In some embodiments, after collecting claim scoping data, the claims processing system 120 may determine whether human intervention to the self-service process is needed. In some embodiments, the claims processing system 120 also determine whether the claim needs to be channeled to a live person to process.

After collecting claim scoping data, the claims processing system 120 is configured to generate a loss estimate at step/operation 604. In some embodiments, the claims processing system 120 may assess each data field of the claim scoping data using a set of pre-programmed business rule to generate one or more claim adequacy scores. Each data field of the claim scoping data may be analyzed and assigned with a relative weighting based on historical proprietary and third party claim analytics data that correlate a set of potential answers for the field with eventual claim outcomes. Structured responses for each data field may be assigned a numeric value depending on their potential impact on the claim. In some embodiments, if the aggregated claim adequacy score fell within a certain range determined to be adequate, the claims processing system 120 may determine that the claim could progress; if the aggregated claim adequacy score fell within a predetermined range that was not adequate for progression, the claims processing system 120 may determine that additional information need to be requested through either digital or human channels.

If the claims processing system 120 determines that the claim can progress, the claims processing system 120 may generate a loss estimate at step/operation 710. In some embodiments, the loss estimate may take the form of costs to repair. The costs to repair may be generated using proprietary and external pricing sources such as data provided by the external computing entity 115 via a pre-established API. The unit costs for each item or activity may be aggregated into an overall cost to repair/replace/compensate for the claimed loss. The costs may be segmented by the type of loss.

After the claims processing system 120 generate the loss estimate, the claims processing system 120 is configured to, at step/operation 606, compare the loss estimate with a pre-defined threshold to determine whether special handling is needed. Example special handling include routing to an adjuster or other staff for review. An updated fraud assessment, using fraud assessment techniques previously described, may also be conducted after the claims processing system 120 generate the loss estimate.

An additional assessment of the claim for potential subrogation may also be initiated and automatically completed by the claims processing system 120. The claims processing system 120 may conduct a digital query of online recalled item databases, databases for items with pending lawsuits related to manufacturer defect, and other sources that identify items for which some party has been identified as potentially liable for damage caused by that item. In the event that an item is identified as having any subrogation potential, a referral is autonomously generated to internal or third party assets who will engage in financial recovery support. The support activities may be conducted while the claim continues to be processed through either automatic or human handling channels.

f. Coverage Determination

After the various assessments are completed or manually skipped, the claims processing system 120 is configured to, by using coverage evaluation module 235, at step/operation 608, determine applicable coverage to the claim. The coverage evaluation module 235 may be pre-programmed with available insurance policy forms, endorsements, limits, schedules, and other related instruments. The language of these forms may be digitally structured and mapped against a comprehensive list of incidents (causes of loss) so that sections of the policy which may be impacted by variables of a specific incident are identified. Each variable may be analyzed and its direct impact on the availability of coverage (e.g., allowing for coverage, limiting coverage, precluding coverage, and/or the like) may be programmed into the platform based on historical proprietary and externally sourced coverage data. If any influencing variables are identified on a particular claim, the coverage impact may be recorded and applied to the overall compensability disposition. An example coverage mapping is provided in FIG. 8.

To identify the influencing variables, the coverage evaluation module 235 is configured to ingest policy data which would then be coupled with the details of the specific loss which were gathered during the FNOL and scoping phases as previously described. In some embodiments, the policy data may include the specific policy and endorsement form numbers, specific limits for the subject property, deductibles, and other financial parameters for the policy on which the claim was made. The coverage evaluation module 235 may also gather additional influencing data such as addresses and descriptions of the insured property, dates when the policy was in force, parties with a contractual interest in the loss, and other information to enable accurate identification of insured property and interested parties or entities. The policy data and additional data may be gathered in the previous FNOL and scoping stage or gathered using techniques similar to the techniques used in the FNOL and scoping stage.

In some embodiments, autonomous identification of specific items subject to exclusions or limits may be identified by the coverage evaluation module 235 by classifying structured categories in repair estimates (flooring, windows, boilers, and others) and matching those items with categories that have been programmed with limits, exclusions, or other special handling requirement as dictated by the individual user's insurance policy for that claim. Similarly with contents items, categories defining item type and usage may be captured within the inventory process (jewelry, firearms, stock, art, consignment items, and/or the like) so that specific limits and exclusions for those items can be identified as necessary. An example policy form for a user is illustrated in FIG. 9. In the example, the loss occurred within the policy period, the incident was not excluded from coverage, the damaged property had no special restrictions on coverage, and the damage amount is within the limits of coverage for the damaged property.

After the coverage evaluation module 235 determines the coverage, the claims processing system 120 is configured to generate a coverage analysis report at step/operation 610. The coverage analysis report may include a monetary amount payable for the claim, a summary report, and external correspondence that communicates the coverage analysis details to interested parties and regulatory entities.

In order to determine the monetary amount, loss estimate previously generated in the scoping stage may be segmented by coverage type (e.g., building/dwelling, business/personal property, loss of use, business income, extra expense, and/or the like) and tallied to produce a total amount of the loss for each type. Any limits applicable to subcategories of items as described previously may be applied to the total compensable amount for those items within that coverage type. Any deductibles based on the incident identified or other special deductible designators may be applied to individual coverage types or the full amount as dictated by the insurance policy. A final monetary amount for each coverage type may then be produced and structured for output to payment portals within the claim system of record.

The summary report may be generated by aggregate data produced from the previously described operational phases (FNOL and Scope) to provide a summary of key facts. These key facts would include the policy forms involved in the loss, customer and interested party's identifying information, coverage types involved, locations involved, limits involved, deductibles involved, coinsurance requirements, and other general information which identifies the subjects of the claim and general policy overviews. Additionally or alternatively, the summary report may restate the identified cause of loss and any ensuing incident. The summary report may also include a coverage disposition summary which indicates whether coverage is available in full, in part, or unavailable for the loss. Relevant language from the insurance policy text may be produced within the disposition summary.

g. Correspondence and Payment

After generating the coverage summary report, the claims processing system 120 is configured to generate one or more correspondences with the user, other interested parties, regulatory entities, and others as necessary. Digital form letters with standardized language previously created may serve as standard shells for the correspondence. These shells may be segmented and designated with specific identifiers depending on the type of information needing to be communicated. The types may include general coverage summaries, coverage denial letters, partial denial letters, regulatory reports, and other relevant communications. The coverage disposition would identify the types of correspondence to be generated based on business rules programmed into the coverage engine. Claims with a disposition indicating coverage was available in full would generate a series of correspondence aligned with that disposition. Similarly, claims with a disposition of partially available coverage or no coverage would generate a series of correspondence aligned with those dispositions. Data extracted from the coverage summary report may populate designated fields within the letter or other communication shells which provide the unique details of the particular claim and its coverage disposition. Similarly the completed letters can be distributed via electronic means (email, text, rendering via native or web app, and/or the like) based on customer preference and applicable regulations.

In some embodiments, intelligent virtual agents, such as IVAs, can also be programed to complete telephone calls to customers to provide the claim details described above if the customer requests this method. The agent may have a standard scripted message programmed into the interface to relay the claim disposition. Scripts may be aligned with the particular disposition of the claim to communicate the availability of coverage and associated indemnity dollar amounts, or any limits or exclusions in a manner consistent with the written correspondence described above. In some embodiments, options to exit the automated service may be available if the customer wishes to speak to a live representative.

In some embodiments, a correspondence to user will include an itemized list of the items that were covered and not covered with ability to click to see further explanation about the coverage decision. Along with the estimate the Replacement Cost Value ("RCV"), Depreciation, Actual Cash Value ("AVC"), Recoverable Depreciation ("RD"), and deductible may be presented with a net amount presented to the policyholder. The correspondence may also include a communication protocol, such as a weblink, for agreeing to proceed with the loss settlement/payment and presenting the user with additional options, such as an option to have the user's property restored/repaired.

In some embodiments, the user may be presented with an option to have his/her property restored/repaired by a preferred contractor. If the user elects to have his/her property restored/repaired by a preferred contractor, the user may be presented with two payment methods 1) receive a direct payment via check, EFT, or other mobile payment methods or 2) opt for LM to directly pay the property contractor that will do the repairs. When customer selects to use a preferred contractor for the repairs, the customer may eSign the "Direction to Pay" form that allows the claims processing system to directly initiate payment to the contractor for the portion of the repairs that the contractor completes. Portions of the claims that contractor and customer mutually agree to be excluded from the repair, will be cashed out to the customer. User may also be presented with an option to use a preference contents vendor for the replacement of contents (clothing, furniture, electronics, etc.).

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising one or more processors and at least one non-transitory computer storage medium storing instructions that, when executed by the one or more processors, cause the apparatus to:
receive a first set of claim evaluation data originating from a first computing device and a second set of claim evaluation data originating from an Internet of Things (IoT) computing device;
generate, based at least in part on one or more trained machine learning models, a plurality of predictive impact assessment scores, each predictive impact assessment score associated with a unique intake field and associated response value of current claim evaluation data for a claim of a user, wherein each intake field of the current claim evaluation data comprises a response value associated with one or more of the first set of claim evaluation data or the second set of claim evaluation data;
responsive to determining, based at least in part on the plurality of predictive impact assessment scores associated with the current claim evaluation data, that an aggregated predictive impact assessment score satisfies an impact assessment threshold, activate, via one or more application programming interfaces (APIs), an augmented reality view interface configured for overlaying on a screen display of the first computing device;
apply the one or more trained machine learning models to one or more captured images received via the one or more application programming interfaces (APIs);
assign a machine learning classifier providing an image subject description to the one or more captured images;
validate, according to a fraud threshold being met, one or more of the one or more captured images for fraud; and
responsive to validating each of the one or more captured images for fraud, determine a coverage for the claim using a coverage mapping for a set of policy data corresponding to an insurance policy of the user.

2. The apparatus of claim 1, further caused to:
responsive to receiving, originating from a first computing device, a notice of loss associated with the claim of the user, collect, originating from one or more external computing devices, customer identity validation data.

3. The apparatus of claim 2, further caused to:
determine whether the customer identity validation data satisfies a first threshold prior to receiving the first set of claim evaluation data and the second set of claim evaluation data.

4. The apparatus of claim 3, wherein the customer identity validation data comprises a plurality of fields each comprising an associated data value.

5. The apparatus of claim 4, further caused to:
assign one or more weights to one or more fields of the customer identity validation data.

6. The apparatus of claim 5, wherein determining whether the customer identity validation data satisfies the first threshold comprises:
evaluating each field for a level of adequacy of its associated data value;
generating an aggregated weighting based at least in part on the one or more weights assigned to the one or more fields; and
comparing the aggregated weighting to the first threshold.

7. The apparatus of claim 1, further caused to:
generate, using the plurality of predictive impact assessment scores associated with current claim evaluation data for a claim of the user, the aggregated predictive impact assessment score.

8. The apparatus of claim 1, wherein validating, according to the fraud threshold being met, each of the one or more captured images for fraud, comprises:
extracting metadata associated with the one or more captured images;
comparing the metadata against third party image sources; and
determining that time stamp data of the metadata is captured before a date of loss associated with a claim of the user.

9. A computer-implemented method, comprising:
receiving, by one or more processors, a first set of claim evaluation data originating from a first computing device and a second set of claim evaluation data originating from an Internet of Things (IoT) computing device;
generating, by the one or more processors and based at least in part on one or more trained machine learning models, a plurality of predictive impact assessment scores, each predictive impact assessment score associated with a unique intake field and associated response value of current claim evaluation data for a claim of a user, wherein each intake field of the current claim evaluation data comprises a response value associated with one or more of the first set of claim evaluation data or the second set of claim evaluation data;
responsive to determining, based at least in part on the plurality of predictive impact assessment scores associated with the current claim evaluation data, that an aggregated predictive impact assessment score satisfies an impact assessment threshold, activating, by the one or more processors and via one or more application programming interfaces (APIs), an augmented reality view interface configured for overlaying on a screen display of the first computing device;
applying, by the one or more processors, the one or more trained machine learning models to one or more captured images received via the one or more application programming interfaces (APIs);
assigning, by the one or more processors, a machine learning classifier providing an image subject description to the one or more captured images;
validating, by the one or more processors and according to a fraud threshold being met, one or more of the one or more captured images for fraud; and
responsive to validating each of the one or more captured images for fraud, determining, by the one or more processors, a coverage for the claim using a coverage mapping for a set of policy data corresponding to an insurance policy of the user.

10. The computer-implemented method of claim 9, further comprising:
responsive to receiving, originating from a first computing device, a notice of loss associated with the claim of the user, collecting, by the one or more processors and originating from one or more external computing devices, customer identity validation data.

11. The computer-implemented method of claim 10, further comprising:
determining, by the one or more processors, whether the customer identity validation data satisfies a first threshold prior to receiving the first set of claim evaluation data and the second set of claim evaluation data.

12. The computer-implemented method of claim 11, wherein the customer identity validation data comprises a plurality of fields each comprising an associated data value.

13. The computer-implemented method of claim 12, further comprising:
assigning, by the one or more processors, one or more weights to one or more fields of the customer identity validation data.

14. The computer-implemented method of claim 13, wherein determining whether the customer identity validation data satisfies the first threshold comprises:
evaluating each field for a level of adequacy of its associated data value;
generating an aggregated weighting based at least in part on the one or more weights assigned to the one or more fields; and
comparing the aggregated weighting to the first threshold.

15. The computer-implemented method of claim 9, further comprising:
generating, by the one or more processors and using the plurality of predictive impact assessment scores associated with current claim evaluation data for a claim of the user, the aggregated predictive impact assessment score.

16. The computer-implemented method of claim 9, wherein validating, according to the fraud threshold being met, each of the one or more captured images for fraud, comprises:
extracting metadata associated with the one or more captured images;
comparing the metadata against third party image sources; and
determining that time stamp data of the metadata is captured before a date of loss associated with a claim of the user.

17. A computer program product comprising at least one non-transitory computer readable storage medium storing instructions that, with one or more processors, cause the one or more processors to:
receive a first set of claim evaluation data originating from a first computing device and a second set of claim evaluation data originating from an Internet of Things (IoT) computing device;
generate, based at least in part on one or more trained machine learning models, a plurality of predictive impact assessment scores, each predictive impact assessment score associated with a unique intake field and associated response value of current claim evaluation data for a claim of a user, wherein each intake field of the current claim evaluation data comprises a response value associated with one or more of the first set of claim evaluation data or the second set of claim evaluation data;
responsive to determining, based at least in part on the plurality of predictive impact assessment scores associated with the current claim evaluation data, that an aggregated predictive impact assessment score satisfies an impact assessment threshold, activate, via one or more application programming interfaces (APIs), an augmented reality view interface configured for overlaying on a screen display of the first computing device;
apply the one or more trained machine learning models to one or more captured images received via the one or more application programming interfaces (APIs);
assign a machine learning classifier providing an image subject description to the one or more captured images;
validate, according to a fraud threshold being met, one or more of the one or more captured images for fraud; and
responsive to validating each of the one or more captured images for fraud, determine a coverage for the claim using a coverage mapping for a set of policy data corresponding to an insurance policy of the user.

18. The computer program product of claim 17, wherein the at least one non-transitory computer readable storage medium stores instructions that, with the one or more processors, further cause the one or more processors to:
responsive to receiving, originating from a first computing device, a notice of loss associated with the claim of the user, collect, by the one or more processors and originating from one or more external computing devices, customer identity validation data; and
determine whether the customer identity validation data satisfies a first threshold prior to receiving the first set of claim evaluation data and the second set of claim evaluation data.

19. The computer program product of claim 18, wherein the customer identity validation data comprises a plurality of fields each comprising an associated data value.

20. The computer program product of claim 18, wherein the at least one non-transitory computer readable storage medium stores instructions that, with the one or more processors, further cause the one or more processors to:
assign one or more weights to one or more fields of the customer identity validation data, wherein determining whether the customer identity validation data satisfies the first threshold comprises:
evaluating each field for a level of adequacy of its associated data value;
generating an aggregated weighting based at least in part on the one or more weights assigned to the one or more fields; and
comparing the aggregated weighting to the first threshold.

* * * * *